United States Patent
Schwartz

(10) Patent No.: US 12,510,534 B2
(45) Date of Patent: Dec. 30, 2025

(54) IN VITRO CELL-BASED REPLACEMENT FOR THE DRAIZE TEST

(71) Applicant: THE TRUSTEES OF PRINCETON UNIVERSITY, Princeton, NJ (US)

(72) Inventor: Jeffrey Schwartz, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 912 days.

(21) Appl. No.: 17/605,303

(22) PCT Filed: May 14, 2020

(86) PCT No.: PCT/US2020/032956
§ 371 (c)(1),
(2) Date: Oct. 21, 2021

(87) PCT Pub. No.: WO2020/232283
PCT Pub. Date: Nov. 19, 2020

(65) Prior Publication Data
US 2022/0205977 A1     Jun. 30, 2022

Related U.S. Application Data

(60) Provisional application No. 62/847,565, filed on May 14, 2019.

(51) Int. Cl.
*G01N 33/50*      (2006.01)

(52) U.S. Cl.
CPC ..... *G01N 33/5014* (2013.01); *G01N 33/5044* (2013.01)

(58) Field of Classification Search
None
See application file for complete search history.

(56) References Cited

U.S. PATENT DOCUMENTS

| | | | |
|---|---|---|---|
| 5,112,676 A | 5/1992 | Cot et al. | |
| 5,827,641 A | 10/1998 | Parenteau et al. | |
| 6,020,148 A | 2/2000 | Osborne et al. | |
| 9,176,116 B2 | 11/2015 | Schmolz | |
| 10,646,896 B2 | 5/2020 | Schwartz et al. | |
| 2004/0001959 A1 | 1/2004 | Schwartz et al. | |
| 2004/0258726 A1 | 12/2004 | Stupp et al. | |
| 2007/0196663 A1 | 8/2007 | Schwartz et al. | |
| 2016/0097938 A1 | 4/2016 | Qiu et al. | |
| 2017/0101628 A1 | 4/2017 | Ingber et al. | |
| 2022/0205977 A1 | 6/2022 | Schwartz | |
| 2022/0226543 A1 | 7/2022 | Yaszemski et al. | |

FOREIGN PATENT DOCUMENTS

| | | |
|---|---|---|
| WO | 2016118349 A1 | 7/2016 |
| WO | 2019036594 A1 | 2/2019 |

*Primary Examiner* — Teresa E Knight
(74) *Attorney, Agent, or Firm* — FOX ROTHSCHILD LLP

(57) ABSTRACT

A cell-based device and method are disclosed for in vitro testing of compositions or compounds for irritation potential. Both the device and method comprise a) a confluent layer of corneal epithelial cells supported on a chemically patterned hydrogel, where the cells are aligned with the chemical pattern, b) a collector to receive effluent fluid, and optionally c) a detector. The device and method can also comprise an extracellular matrix (ECM) assembled by corneal keratocytes supported on the chemically patterned hydrogel. The cell-based device and method provide simple replacements for the in vivo Draize rabbit eye irritation test.

20 Claims, 4 Drawing Sheets

IN VITRO CELL-BASED REPLACEMENT FOR THE DRAIZE TEST

CROSS-REFERENCE TO RELATED APPLICATION

The present application is the U.S. National Phase of International Patent Application Serial No. PCT/US20/32956, filed May 14, 2020, which claims the benefit of priority of U.S. Provisional Application No. 62/847,565, filed on May 14, 2019, the entire disclosure of which is incorporated herein by reference in its entirety. This application is also is related to International Application No. PCT/US2018/046879, filed on Aug. 17, 2018, which claims priority to U.S. Provisional Application No. 62/546,885 filed on Aug. 17, 2017, the entire disclosures of which are incorporated herein by reference in their entirety.

FIELD OF THE INVENTION

The present invention is related to the field of methods and devices for in vitro testing of compositions or compounds for irritation potential. Standard methodology in the field includes the in vivo Draize rabbit eye irritation test.

BACKGROUND

The Draize Test is an acute toxicity test developed in 1944 by John H. Draize and colleagues, toxicologists at the Food and Drug Administration (FDA). Initially the test was designed for testing cosmetics, and involves applying a test substance to one eye of a restrained, conscious animal, typically a New Zealand White rabbit, and then leaving it for a set amount of time before rinsing out and recording the effects. The second eye serves as the untreated control. Treated animals are observed for up to 14 days for redness, swelling, discharge, ulceration, hemorrhaging, cloudiness, other changes to the cornea, conjunctiva, or iris, or actual blindness in the tested eye. The animals are euthanized after testing if the test causes irreversible damage to the eye.

The tests are controversial, being viewed as cruel, as well as potentially unscientific due to the differences between rabbit and human eyes, and the subjective nature of the visual evaluations. The FDA supports the test as being a gold standard irritation test for cosmetics and the EPA also collects Draize Data for pesticides. Because of its controversial nature, the use of the Draize test in the U.S. and Europe has declined recently, and the EU has actually banned the in vivo testing of finished cosmetics as of 2013.

Thus, a well-defined, simple in vitro test is desirable to replace the Draize test to assess irritation potential for cosmetics and other chemicals.

SUMMARY

The present invention meets these needs by providing both a simple cell-based device and an in vitro cell-based method for assessing the irritant potential of cosmetics and other compositions or chemicals, where the device and method replicate natural tissue by employing a confluent layer of corneal cells that includes close cell-cell contacts.

One aspect of the invention is directed to a cell-based device for in vitro testing of compositions or compounds for irritation potential, the device comprising: a confluent layer of corneal epithelial cells supported on a chemically patterned, water-saturated hydrogel, where the cells are confluent and aligned with the chemical pattern. The device may optionally include a detector responsive to the composition or compound being tested, the detector optionally being placed below the supporting hydrogel. The device can further comprise a collagen-rich extracellular matrix (ECM) assembled by a confluent layer of corneal keratocytes aligned with and supported on the chemically patterned hydrogel, upon which ECM and the aligned confluent layer of epithelial cells are formed. The corneal keratocytes are confluent and aligned because of the underlying chemical pattern, which then, in turn, guide the alignment and confluence of the applied epithelial cells.

The hydrogel of the device can comprise a biocompatible cross-linked hydrophilic polymer hydrogel. The biocompatible cross-linkable polymer can be selected from the group consisting of polyethylene glycol, polyacrylate, polyacrylamide, and polyvinyl alcohol. The biocompatible cross-linkable polymer can be a cross-linkable polysaccharide or polysaccharide derivative selected from the group consisting of polysaccharides, alginates, hyaluronic acids, guar gum, xanthan gum, carrageenan, methyl cellulose, carboxymethyl cellulose, ethyl methyl cellulose, hydroxypropyl cellulose, and hypromellose. Preferably the biocompatible cross-linkable polymers are cross-linked with fumarate or another dicarboxylic acid. The biocompatible hydrophilic polymer can be oligo(polyethylene glycol) cross-linked with fumarate (OPF).

The chemical pattern of the device comprises an inorganic oxide adhesion layer bonded to the surface of an at least partially hydrated, biocompatible, cross-linked hydrophilic polymer hydrogel, where the inorganic oxide is selected from the group consisting of the oxides of Ti, Zr, Al, Mg, Si, Zn, Mo, Nb, Ta, Sn, W, and V. Preferably the inorganic oxide is selected from the group consisting of the oxides of Al, Ti, Zr, Si, Mg and Zn. The adhesion layer comprises a pattern over at least part of the hydrogel surface. Preferably the chemical pattern comprises continuous parallel stripes spanning at least part of the hydrogel surface. Preferably the chemical pattern further comprises a self-assembled monolayer of phosphonates (SAMP). The SAMP can be selected from the group consisting of $C_3$-$C_{30}$ $\alpha$, $\omega$-diphosphonates.

Preferably the epithelial cells of the device are conical epithelial cells. More preferably the corneal epithelial cells are human corneal epithelial cells.

The detector of the device is preferably an infrared (IR) detector.

Another aspect of the invention is directed to a method for in vitro cell-based testing of compositions or compounds for irritation potential, comprising the steps of: providing a confluent layer of corneal epithelial cells supported on a chemically patterned, water-saturated hydrogel, where the cells are aligned with the chemical pattern; adding a composition or compound to the aligned confluent corneal epithelial cell layer; monitoring diffusion of the composition or compound through the corneal epithelial cell layer using a detector responsive to the composition or compound; and assessing damage to the corneal epithelial cells visually or microscopically. The method can further comprise a collagen-rich extracellular matrix (ECM) assembled by human corneal keratocytes supported on the chemically patterned hydrogel, upon which ECM the aligned confluent layer of corneal epithelial cells is formed. The corneal epithelial cells are preferably human corneal epithelial cells. The monitoring of the method can utilize infrared, UV or Raman spectroscopy; preferably monitoring comprises infrared (IR) detection.

The hydrogel of the method preferably comprises oligo (polyethylene glycol) cross-linked with fumarate (OPF).

The chemical pattern of the method comprises an inorganic oxide adhesion layer bonded to the surface the hydrogel, where the inorganic oxide is selected from the group consisting of the oxides of Al, Ti, Zr, Si, Mg and Zn. Preferably the chemical pattern further comprises a self-assembled monolayer of phosphonates (SAMP). The SAMP can beselected from the group consisting of $C_3$-$C_{30}$ α, ω-diphosphonates. The pattern preferably comprises continuous parallel stripes spanning at least part of the hydrogel surface.

DETAILED DESCRIPTION

Figure 1:
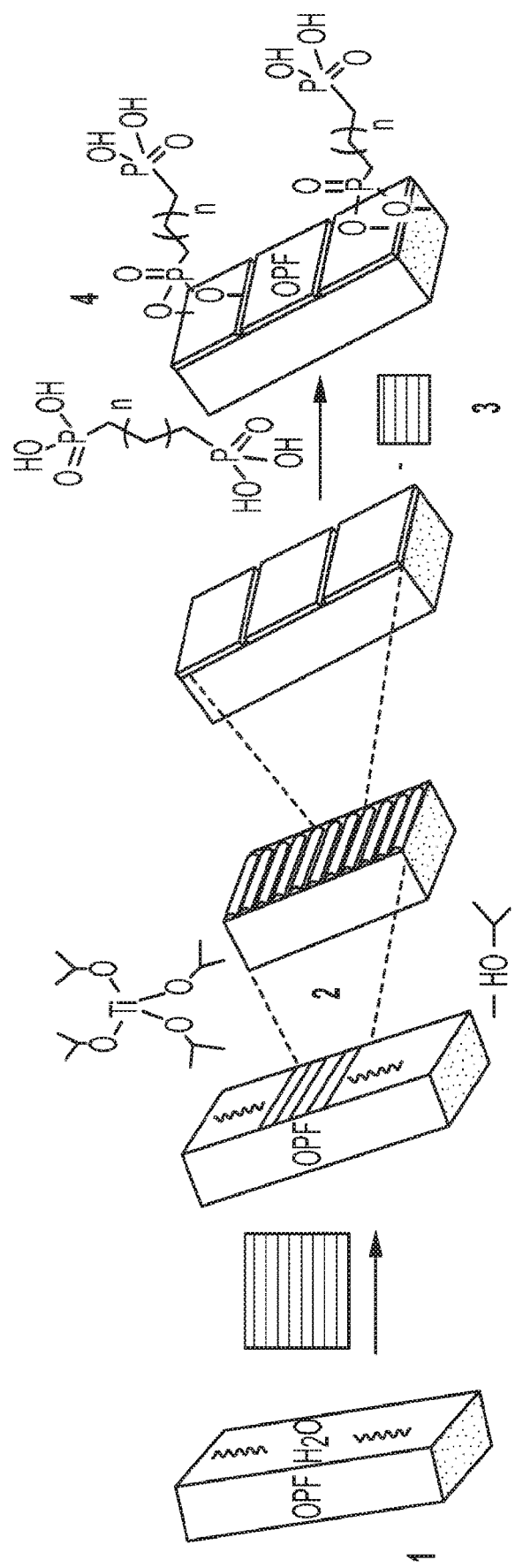
FIG. 1 shows the scheme for SAMP formation on fully hydrated, hydrophilic, cell non-adhesive oligo(polyethylene glycol) fumarate (OPF) hydrogel. Hydrogel (1) is debossed with a shadow mask. The material suspended in a hydrophobic solvent is then exposed to the titanium alkoxide (2), also in a hydrophobic solvent. This surface-treated hydrogel is then reacted with a diphosphonoalkane (3) to give the patterned cell-adhesive layer on the hydrogel surface (4).

The cornea epithelium is described as having an uninterrupted layer of cells in which intercellular spaces are small. These characteristics also describe what is observed for growth of NIH 3T3 cells on a "chemical" pattern that consists of parallel stripes of a two-component cell adhesion layer prepared on a hydrated hydrogel by a sequence of debossing the hydrogel, exposure to a Ti or Zr alkoxide, and termination with a cell-adhesive (phosphono)alkyl-phosphonate monolayer. This sequence has been recently described by the inventors in *ACS Applied Materials & Interfaces*, 2019, 11, 15411-15416, published Mar. 29, 2019. Thus, as shown in FIG. 1, hydrogel (1) is debossed with a shadow mask. The material suspended in a hydrophobic solvent is then exposed to the titanium alkoxide (2), also in a hydrophobic solvent. This surface-treated hydrogel is then reacted with a cell-adhesive (phosphono)alkyl-phosphonic acid (3) to give the patterned cell-adhesive layer on the hydrogel surface (4). Cells plated on this ensemble spatially align with the chemical pattern, and the extracellular matrix (ECM) they assemble is also organized in alignment with the underlying chemical pattern.

The devices and methods of the present invention are based on patterned hydrogel technology, as disclosed by the inventors in PCT/US2018/046879 (WO 2019/036594 A1), which is incorporated herein by reference.

The term "hydrogel" refers to a hydrophilic polymer, preferably cross-linked, which readily loads with water. A hydrogel typically is highly oxygenated with functional groups such as hydroxyl, ethers and carboxylic acids or carboxylate salts. The hydrogels useful in the present invention are preferably compatible with biomedical applications and can be synthetic, such as PEG derivatives, polyacrylamides and silicones, or natural polymers, such as polysaccharides, alginates, hyaluronic acids, gums (guar, xanthan, carrageenan), methyl cellulose, carboxymethyl cellulose, ethyl methyl cellulose, hydroxypropyl cellulose, and hypromellose. The term "full hydration" refers to a hydrogel fully saturated with water, i.e., to its maximum holding capacity. The term "partial hydration" refers to a hydrogel that contains at least sufficient water on its surface, or available to the surface, to react with a water-reactive inorganic compound forming the desired inorganic oxide pattern. At least 10 nmol of water/cm$^2$ should be at the surface or available to the surface of the hydrogel polymer, vide infra. As used herein, the term "hydrophobic solvent" means a solvent that sequesters water. Suitable hydrophobic solvents include hydrocarbons, and halogenated hydrocarbons such as chlorinated and fluorinated hydrocarbons. The hydrocarbons can include aromatic solvents such as xylenes and toluene, and alkanes such as $C_4$-$C_{22}$ straight, branched or cyclic alkanes. Preferably the aromatic solvents are xylenes and toluene. Preferably the alkane hydrocarbon solvents are $C_5$ to $C_{20}$ hydrocarbons, straight, branched or cyclic. These can include pentane, hexane, heptane, octane, and their isomers. Cyclic hydrocarbons can include cyclopentane, cyclohexane, cycloheptane, cyclooctane, etc. The hydrophobic solvent should not be strongly bound to the hydrogel, which would preclude the intended biocompatible use of the patterned hydrogel. As used herein the term "bonded" means affixed or attached, preferably coordinatively or covalently attached. Unless otherwise noted, as used herein the term "about" refers to plus or minus 10% of the indicated number. For example, "about 10%" may indicate a range of 9% to 11%, and "about 20" may mean from 18 to 22. Other meanings of "about" may be apparent from the context, such as rounding off, so, for example "about 1" may also mean from 0.5 to 1.4.

The surface of the hydrogel can be patterned or unpatterned. The patterned hydrogel surface can be in various configurations. Preferably, for cell growth and alignment continuous oxide layer stripes are deposited across the hydrogel surface of the cell growth region, and each continuous oxide stripe layer spans the entire length of the cell growth surface. A stripe is typically continuous for at least about 1 mm up to the entire length of the hydrogel base layer. The stripes can be 1-20 mm or longer, depending on the size of the hydrogel base layer and the construct to be fabricated: at least 1 mm, or 2 mm, or 5 mm, or 10 mm, or 15 mm, or 20 mm or longer. The cell growth surface preferably has an alternating pattern of continuous parallel oxide stripes with hydrogel surface stripes therebetween. Preferably the parallel oxide layer stripes are about 10 μm to about 100 μm wide separated by parallel hydrogel base layer stripes about 10 μm to about 100 μm wide. More preferably, stripe patterned arrays have oxide layer stripes about 10 μm to about 30 μm wide separated by base layer stripes about 10 μm to about 30 μm wide. Examples include, without limitation, oxide stripes about 10 μm wide and base layer stripes about 30 μm wide, or about 20 μm wide and about 30 μm wide, or about 30 μm wide and about 30 μm wide, or about 20 μm wide and about 20 μm wide, or about 20 μm wide and about 10 μm wide, or about 10 μm wide and about 10 μm wide, respectively. Such a parallel pattern of alternating oxide layer and base layer stripes is favorable for cell attachment, and growth to confluence with alignment to the chemical pattern.

Alignment can be quantified on each surface using Fast Fourier Transform (FFT) analysis by measuring the aspect ratio of the FFT output image. The aspect ratio is derived by dividing the vertical dimension of the oval output pattern by the horizontal dimension of the oval pattern that is produced by the FFT. The FFT output produces an image in which the width of the oval (the horizontal dimension) is rotated 90° with regard to the (vertical) pattern direction; thus perfect alignment with a pattern that is vertical on the page would generate an FFT that is a perfect horizontal line. Therefore, the longer the horizontal dimension and the shorter the vertical dimension of the oval pattern (giving the smallest numerical ratio), the better the alignment of the cells with the pattern; perfect alignment would have a ratio of close to zero. Thus, smaller numerical values of the ratio indicate better alignment. In practice, values such as about 0.2 to about 0.6 are obtained, indicating good alignment. Typical values are 0.5 to 0.6. Values of 0.9 to 1.0 indicate an unaligned matrix.

The patterning of hydrogels requires different techniques from those discovered previously by the inventors, as well as different from those known in the prior art. In order to apply the oxide coating in a patterned way to the soft, fragile surface of a hydrated hydrogel, the hydrogel is first debossed with a shadow mask that is configured to create raised surfaces in the form of a pattern that, in turn, is configured to attach tissue cells and direct their growth in alignment, so the oxide can then be placed on raised ridges of hydrogel with the shadow mask still in place. The present invention thus also includes patterned hydrogel substrates formed by this method.

The shadow mask is preferably configured to create raised parallel stripes on the surface of the hydrogel, however any pattern capable of directing the growth and alignment of tissue cells may be used. Shadow masks are prepared by laser-cutting parallel stripes in sheets of KAPTON® polyimide film; masks consisting of parallel ablated stripes about 10 μm to about 100 μm wide that are separated by unablated KAPTON® stripes about 10 μm to about 100 μm wide are typically used. The KAPTON® film is preferably 20 μm to 50 μm thick. Striped KAPTON® masks of about 30 μm×30 μm are typically prepared and used.

Dried OPF is typically cut into 5 mm×5 mm squares and hydrated with water to form 1 cm×1 cm hydrated OPF squares, the swelling of the polymer being due to the uptake of water. The samples are then rinsed with deionized water and gently dried. The laser-ablated KAPTON® shadow mask is placed onto the OPF such that the striped area is directly in contact with the OPF surface. The OPF-mask composite is heated to 30° C., and the mask is depressed into the OPF (debossing) using an appropriate weight, thereby creating raised stripes of hydrogel which emerge through the ablated regions of the mask. Heating with the mask in place is continued briefly, and excess water is removed from the surface of the OPF-mask ensemble.

The ensemble is then immersed in a metal oxide precursor solution for an appropriate period of time. The ensemble is removed, rinsed and then heated to 30° C. briefly. This process creates a layer of cross-linked oxide that is patterned on the raised OPF surface since only the regions of the OPF that are not covered by the KAPTON® shadow mask (the ablated stripes) are exposed to the solution of the titanium or zirconium alkoxide. The ensemble is removed from heat and allowed to cool before being immersed in a phosphonic acid solution to form a SAMP, again in raised stripes emerging through the ablated regions of the mask. Cell adhesive stripes on the oxide covered areas of the raised OPF surface are formed, for example, by reacting 1,12-dodecanediphosphonic acid with the metal oxide layer. The KAPTON® mask is then separated mechanically from the OPF surface and the patterned OPF heated at 30° C. briefly. Thus, raised SAMP stripes are created in the hydrogel by the masking process aspect of the invention. Freshly prepared patterned OPF samples can be stored either under water or PBS.

One aspect of the hydrogel patterning is a patterned hydrogel comprising an inorganic oxide adhesion layer bonded to the surface of an at least partially hydrated, biocompatible, cross-linked hydrophilic polymer hydrogel, where the inorganic oxide is selected from the group consisting of the oxides of Ti, Zr, Al, Mg, Si, Zn, Mo, Nb, Ta, Sn, W and V. Preferably the inorganic oxide of the patterned hydrogel is selected from the group consisting of the oxides of Al, Ti, Zr, Si, Mg and Zn.

With regard to the inorganic oxide pattern, the non-oxygen inorganic species is preferably not toxic in medical applications, and can be advantageously selected from the group consisting of Ti, Zr, Al, Mg, Si, Zn, Mo, Nb, Ta, Sn, W, and V. Preferably the inorganic species is Al, Ti, Zr, Si, Mg or Zn. More preferably the inorganic species is Al, Si, Ti or Zr. The inorganic species can be Al. The inorganic species can be Ti. The inorganic species can be Zr. The inorganic species can be Mg. The inorganic species can be Si. The inorganic species can be Zn. The inorganic species can be Mo. The inorganic species can be Nb. The inorganic species can be Ta. The inorganic species can be Sn. The inorganic species can be W. The inorganic species can be V.

The thicknesses of the inorganic oxide layers applied by various methods has been measured for comparison with the present method. Vapor deposition on various non-hydrogel polymeric surfaces (using, for example zirconium tetra-tert-butoxide) ranges from about 1-10 nanometers. Since each oxide "monolayer" is about 0.3 nm thick, this translates to about 3-30 monolayers. For hydrogels, using the presently disclosed method, and without wishing to be bound by any particular theory, the number of monolayers formed depends on the ability of water to transport through the first-applied oxide monolayer, so that further layers can be formed by the above-described reaction with water. As water movement through the first applied oxide monolayer does not appear to be limiting, an ultrathin layer of about 0.3 nm (1 monolayer) to about 20 nm (60 monolayers) thickness is observed. The ultrathin oxide layer is preferably about 0.3 to about 15 nm, or about 0.3 to about 10 nm, or about 0.3 to about 5 nm, or about 0.3 to about 1 nm thick. The ultrathin layer of oxide can be about 0.3 nm, or about 0.5 nm, or about 1 nm, or about 2 nm, or about 3 nm, or about 4 nm, or about 5 nm, or about 10 nm, or about 15 nm, or about 20 nm thick.

Surprisingly it has been discovered that the hydrated, biocompatible, hydrophilic polymer hydrogel can contain as little as 10 nmol of water/cm$^2$ at the surface or available to the surface of the hydrogel, in order for the ultrathin inorganic oxide pattern to form. The available surface water can be at least 10, or at least 12, or at least 14, or at least 16, or at least 18, or at least 20 nmol/cm². The biocompatible hydrophilic polymer hydrogel can also be fully hydrated.

The biocompatible hydrophilic polymer is a cross-linkable polymer and can be selected from polyethylene glycol, polyacrylate, polyacrylamide, and polyvinyl alcohol. As used herein, the term "polyacrylate" denotes polyacrylic acids as well as their esters, such as the methyl ester or ethyl ester. The polyacrylate class can also include alkyl acrylates such as methacrylates, ethacrylates and esters thereof. The cross-linkable polymer can be a cross-linkable polysaccharide or polysaccharide derivative selected from the group consisting of polysaccharides, alginates, hyaluronic acids, guar gum, xanthan gum, carrageenan, methyl cellulose, carboxymethyl cellulose, ethyl methyl cellulose, hydroxypropyl cellulose, and hypromellose (hydroxypropyl methyl cellulose). The cross-linkable polymers can be cross-linked with a dicarboxylic acid, such as fumarate, or other linking agents. The dicarboxylic acid cross-linking agent can also be a dicarboxylic acid derivative, such as a diester or anhydride. Preferably the biocompatible hydrophilic polymer is oligo(polyethylene glycol) fumarate (OPF).

The chemically patterned hydrogel can further comprise a self-assembled monolayer (SAM) bonded to the adhesion layer, where the SAM is selected from organic compounds comprising a phosphonic, carboxylic, sulfonic, phosphinic, phosphoric, sulfinic, or hydroxamic group. Preferably the SAM comprises a self-assembled monolayer of phosphonates (SAMP). The phosphonates can be selected from the group consisting of cell-adhesive phosphonates. These cell-adhesive phosphonates can be selected from the group consisting of phosphonic acids having the structure:

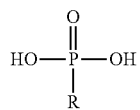

where the R group is selected from the group consisting of optionally substituted alkyl, optionally substituted heteroalkyl, optionally substituted alkenyl, optionally substituted heteroalkenyl, optionally substituted alkynyl, optionally substituted heteroalkynyl, optionally substituted aryl, optionally substituted arylalkyl, optionally substituted heteroaryl, and optionally substituted heteroarylalkyl, where heteroalkyl, heteroalkenyl, heteroalkynyl, heteroaryl and heteroarylalkyl contain one or more heteroatoms selected from the group consisting of O, N and S. The optional substitution on the R group can comprise one or more groups selected from halogen, alkoxy, hydroxyl, amino, carboxylic acid, carboxylate ester, phosphonic acid, phosphonate, ether, alkyne, azide, thiol, polyol moieties and sugar alcohol moieties.

Preferably the cell-adhesive phosphonates are selected from the group consisting of R=$C_3$-$C_{30}$ alkyl substituted with a further phosphonate group. The alkyl group can be a $C_4$-$C_{24}$ alkyl, or a $C_6$-$C_{20}$ alkyl, or a $C_8$ to $C_{18}$ alkyl. The alkyl group can be a $C_3$, $C_4$, $C_6$, $C_8$, $C_{10}$, $C_{12}$, $C_{14}$, $C_{16}$, $C_{18}$, or $C_{20}$ alkyl group. More preferably the cell-adhesive phosphonates are selected from the group consisting of $C_3$-$C_{30}$ α, ω-diphosphonates. In this case the alkylene group between the phosphonate moieties can be a $C_3$, $C_4$, $C_6$, $C_8$, $C_{10}$, $C_{12}$, $C_{14}$, $C_{16}$, $C_{18}$, $C_{20}$, $C_{22}$, $C_{24}$, $C_{26}$, $C_{28}$, or $C_{30}$ alkylene group. The α, ω-diphosphonic acid can be a $C_{3-16}$ α, ω-diphosphonic acid, preferably a $C_{4-12}$ α, ω-diphosphonic acid, more preferably a $C_4$, a $C_6$, a $C_8$, a $C_{10}$, or a $C_{12}$ α, ω-diphosphonic acid. The α, ω-diphosphonic acid can be 1,4-butanediphosphonic acid, or 1,6-hexanediphosphonic acid, or 1,8-octanediphosphonic acid, or 1,10-decane-diphosphonic acid, or 1,12-dodecanediphosphonic acid, or mixtures of two or more thereof.

Preferably the SAMP of the patterned hydrogel comprises a phosphonic acid covalently attached to the inorganic oxide adhesion layer, which phosphonic acid contains functionality adapted for cell binding. As noted above, the cell-binding phosphonic acid can comprise one or more functional groups selected from polyol moieties, sugar alcohol moieties, alkoxy, hydroxyl, amino, carboxylic acid, carboxylate ester, phosphonic acid, phosphonate, ether, alkyne, azide and thiol. Preferably the phosphonic acid is a diphosphonic acid, more preferably an α, ω-diphosphonic acid as described above.

Another aspect of the invention is directed to a cell-based device for testing compositions or compounds for irritation potential, comprising a chemically patterned hydrogel containing a SAM or SAMP bonded to the raised inorganic oxide pattern. The construct can further comprise cells attached to the SAM- or SAMP-patterned surface of the hydrogel. The cells are preferably selected from the group consisting of corneal fibroblasts and corneal keratocytes. Corneal epithelial keratocytes are specialized corneal fibroblasts residing in the stroma. The corneal keratocyte layer represents about 85-90% of corneal thickness, and is built up from highly regular collagenous lamellae and extracellular matrix components. The construct can further comprise an extracellular matrix (ECM). The ECM is a collection of extracellular molecules secreted and assembled by cells that provides structural and biochemical support to the surrounding cells. The construct can optionally be further decellularized, leaving the ECM attached.

The hydrogel patterning can be implemented as follows. Friable sheets of superficially dried, 0.08 mm thick oligo(polyethylene glycol) fumarate (OPF) were provided by the Mayo Clinic, Rochester, MN; they swell and become mechanically fragile on rehydration in Milli-Q® water (under these conditions, a 4 mm×4 mm coupon of "dry" OPF swells to about 12 mm×12 mm). In a typical experiment, a rehydrated coupon was razor cut to 1 cm×1 cm and then put in a solution of 30 µL of a titanium alkoxide, such as titanium tetra-isopropoxide, in 5 mL of a hydrophobic solvent, such as xylene (toluene or hexane are comparable for use) for about 1 min. A rapid reaction occurred at the coupon surface, presumably by hydrolysis with hydrogel-supplied water, and cross-linking of hydroxytitanium species thus formed produced a thin surface pattern of white titanium dioxide, identified by electron-dispersive X-ray spectroscopy (EDS) analysis. If a hydrophilic solvent such as iso-propanol was used instead, rapid hydrolysis occurred in the supernatant as well as at the coupon surface and the coupon physically distorted; both effects are apparently due to solvent-assisted dehydration of the hydrogel, and the precipitated $TiO_2$ pattern was not firmly attached and easily spalled from the surface. The coupon patterned using a hydrophobic solvent, was removed from solution, gently rinsed with iso-propanol, and heated on a glass plate to 35° C. for about 1 min to further cross-link surface Ti species. No ostensible physical changes were observed for heating at this temperature; however, noticeable curling of samples was noted when the heating temperature was >40° C. On cooling to room temperature, the coupon was immersed in a solution of a phosphonic acid for about 1 hr, then rinsed and warmed to 35° C. for 1 min to ensure formation of the phosphonate monolayer (SAMP).

Octadecylphosponate (ODPA) can be used as a diagnostic ligand of SAMP formation (2.5 mg ODPA in 5 mL of toluene or xylene); water wetting contact angle measurements and infrared (IR) spectroscopy could then be used to assess the SAMP structure and interface stability. IR spectroscopy of six coupons, at three locations on each, showed $V_{CH2antisymm}$ at 2918-2915 cm$^{-1}$, indicating a well-ordered phosphonate monolayer. As a control, it was determined that ODPA does not adhere to hydrated OPF in the absence of the TiO$_2$ adhesion layer. To determine the stability of the interface-SAMP ensemble, IR spectroscopy was used to examine effects of ethanol rinsing of treated coupons, as well as their immersion in phosphate-buffered saline (PBS) for up to 7 days. Neither procedure resulted in significant loss in IR signal intensity or change in position for this characteristic indicator of film content and order, after any weakly adsorbed multilayer was rinsed away.

Thus, a two-step method can be used to prepare a thin adhesion layer on a hydrated hydrogel. It has also been shown that monolayers of cell-adhesive organophosphonates can be assembled on this adhesion layer. Through choice of the phosphonic acid, a cell-adhesive SAMP termination can be imparted to the otherwise hydrophilic, cell non-adhesive hydrogel substrate. A SAMP/TiO$_2$/OPF ensemble provided the means to study interface stability. This method utilized the water of the hydrogel, itself, as a reagent to hydrolyze an inorganic water-reactive compound, such as an inorganic alkoxide or an inorganic amide, and to deposit and cross-link a thin pattern of an inorganic oxide, such as titanium dioxide, on the hydrogel surface that is delivered to the surface in a hydrophobic solvent. Further, it has now been demonstrated that the surface of the hydrogel can be patterned, as disclosed herein. Given its simplicity, and the versatility that is derived from the structural variety of available phosphonic acids, it is believed that the present inorganic oxide/SAMP approach to the control of hydrogel surface properties has the potential not only to augment, but even to replace, many of the complex routes reported for surface treatment of hydrogels.

In summary, the chemical patterning method converts an otherwise unreactive hydrogel material into one that is reactive at the surface, and this reactive surface can be advantageously patterned by debossing. The surface reactivity can be controlled by the top chemical pattern layer applied to the surface, so that cell attachment, spreading and ECM formation is encouraged. Growing corneal keratocytes to confluence on such a surface provides a monolayer of cells which are aligned with the chemical pattern. This construct can be used as the basis for fabricating a cell-based device useful as an in vitro replacement for the Draize test.

One aspect of the invention is directed to a cell-based device for in vitro testing of compositions or compounds for irritation potential. Device 1 includes: a receptacle for receiving a fluid containing the test material, a confluent layer of epithelial cells supported on a chemically patterned, water-saturated hydrogel, where the cells are aligned with the chemical pattern and the hydrogel is configured to receive the fluid containing the test material from the receptacle; a collector configured to receive effluent fluid from the hydrogel, and optionally a detector responsive to the composition or compound being tested, the detector optionally being placed below the supporting hydrogel.

Device 2 comprises: a receptacle for receiving a fluid containing the test material, a confluent layer of epithelial cells, aligned on the surface of a collagen-rich extracellular matrix (ECM) assembled by corneal keratocytes supported on a chemically patterned, water-saturated hydrogel, where both the ECM and confluent layer of epithelial cells are aligned with the chemical pattern, and the hydrogel is configured to receive the fluid containing the test material from the receptacle; a collector configured to receive effluent fluid from the hydrogel; and optionally a detector responsive to the composition or compound being tested, the detector optionally being placed below the supporting hydrogel.

The hydrogel of either device can comprise a biocompatible cross-linked hydrophilic polymer hydrogel. The biocompatible cross-linkable polymer can be selected from the group consisting of polyethylene glycol, polyacrylate, polyacrylate, and polyvinyl alcohol. The biocompatible cross-linkable polymer can be a cross-linkable polysaccharide or polysaccharide derivative selected from the group consisting of polysaccharides, alginates, hyaluronic acids, guar gum, xanthan gum, carrageenan, methyl cellulose, carboxymethyl cellulose, ethyl methyl cellulose, hydroxypropyl cellulose, and hypromellose. Preferably the biocompatible cross-linkable polymers are cross-linked with a dicarboxylic acid, such as fumarate. The biocompatible hydrophilic polymer preferably comprises oligo(polyethylene glycol) cross-linked with fumarate (OPF).

The chemical pattern of the device comprises an inorganic oxide adhesion layer bonded to the surface of an at least partially hydrated, biocompatible, cross-linked hydrophilic polymer hydrogel, where the inorganic oxide is selected from oxides of Ti, Zr, Al, Mg, Si, Zn, Mo, Nb, Ta, Sn, W, and V. Preferably the inorganic oxide is selected from oxides of Al, Ti, Zr, Si, Mg and Zn. The inorganic oxide can be Al. The inorganic oxide can be Ti. The inorganic oxide can be Zr. The inorganic oxide can be Si. The inorganic oxide can be Mg. The inorganic oxide can be Zn. The adhesion layer comprises a pattern over at least part of the hydrogel surface, preferably a major contiguous portion of the hydrogel surface.

The adhesion layer can contiguously cover about 50% or about 60% or about 70% or about 80% or about 90% or 100% of the hydrogel surface. Preferably the chemical pattern comprises continuous parallel stripes spanning at least part of the hydrogel surface. The parallel stripes can contiguously cover about 50% or about 60% or about 70% or about 80% or about 90% or 100% of the hydrogel surface. Preferably the chemical pattern further comprises a self-assembled monolayer of phosphonates (SAMP). The SAMP can be selected from the group consisting of $C_3$-$C_{30}$ α, ω-diphosphonates. The SAMP can comprise $C_4$- or $C_5$- or $C_6$- or $C_7$- or $C_8$- or $C_9$- or $C_{10}$- or $C_{11}$- or $C_{12}$-α, ω-diphosphonates.

Preferably the epithelial cells of the device are conical epithelial cells. More preferably the corneal epithelial cells are human corneal epithelial cells.

The detection method of the device preferably comprises infrared (IR) detection. The detector of the device is preferably an infrared (IR) detector. The detector can be an IR spectrometer.

Another aspect of the invention is directed to a method for in vitro cell-based testing of compositions or compounds for irritation potential. Two different methods are possible. Method 1 comprises the steps of: providing a source of test material comprising a composition or compound of interest; providing a confluent layer of corneal epithelial cells supported on a chemically patterned, water-saturated hydrogel, where the cells are aligned with the chemical pattern; adding a composition or compound to the aligned confluent corneal epithelial cell layer; collecting an effluent fluid in a collector;

monitoring diffusion of the composition or compound through the corneal epithelial cell layer using a detector responsive to the composition or compound; and assessing damage to the corneal epithelial cells visually or microscopically.

Method 2 comprises the steps of: providing a source of test material comprising a composition or compound of interest; providing a confluent layer of epithelial cells, aligned on the surface of a collagen-rich extracellular matrix (ECM) assembled by corneal keratocytes supported on a chemically patterned, water-saturated hydrogel, where both the ECM and confluent layer of epithelial cells are aligned with the chemical pattern; adding a composition or compound to the aligned confluent corneal epithelial cell layer; collecting an effluent fluid in a collector; monitoring diffusion of the composition or compound through the corneal epithelial cell layer using a detector responsive to the composition or compound; and assessing damage to the corneal epithelial cells visually or microscopically.

The corneal epithelial cells are preferably human corneal epithelial cells. Monitoring of the method can comprise IR, UV or Raman spectroscopy. Monitoring can comprise infrared (IR) detection. Monitoring can comprise ultraviolet (UV) detection. Monitoring can comprise Raman detection. Monitoring can be accomplished with a spectrophotometer such as an IR spectrometer, a UV spectrometer, or a Raman spectrometer.

The hydrogel of the method preferably comprises oligo(polyethylene glycol) cross-linked with fumarate (OPF).

The chemical pattern of the method comprises an inorganic oxide adhesion layer bonded to the surface the hydrogel, where the inorganic oxide is selected from the group consisting of the oxides of Al, Ti, Zr, Si, Mg and Zn. The inorganic oxide can be Al. The inorganic oxide can be Ti. The inorganic oxide can be Zr. The inorganic oxide can be Si. The inorganic oxide can be Mg. The inorganic oxide can be Zn. Preferably the chemical pattern further comprises a self-assembled monolayer of phosphonates (SAMP). The SAMP can be selected from the group consisting of $C_3$-$C_{30}$ α, ω-diphosphonates. The SAMP can comprise $C_4$- or $C_5$- or $C_6$- or $C_7$- or $C_8$- or $C_9$- or $C_{10}$- or $C_{11}$- or $C_{12}$-α, ω-diphosphonates. The pattern preferably comprises continuous parallel stripes contiguously spanning at least part of the hydrogel surface. The parallel stripes can contiguously cover about 50% or about 60% or about 70% or about 80% or about 90% or 100% of the hydrogel surface.

EXAMPLES

General. Materials. OPF polymer was provided by Dr. Nicolas Madigan (Windebank Lab, Mayo Clinic). OPF samples were hydrated in a glass petri dish using Milli-Q® (MQ) water and then cut into 1 cm×1 cm squares. All hydrated samples were stored in MQ water in scintillation vials, the dehydrated samples were placed in a container and stored inside a desiccator. Milli-Q® ultrapure water was obtained from the Millipore Corporation.

All other materials were procured from commercial sources. Solvents and chemical reagents used in the processing of OPF or other hydrogel polymers include methanol (Sigma Aldrich), iso-propanol (Sigma Aldrich), tert-butanol (Fisher Scientific), 200 proof ethanol (Pharmco-Aaper), xylene (EMD Millipore Corporation), toluene (EMD Chemical Inc.), hexanes (Sigma Aldrich), titanium (IV) tetra-iso-propoxide (Sigma Aldrich), 1,4-butanediphosphonic acid (Acros Organics), 1,12-dodecanediphosphonic acid (Sigma Aldrich), and phosphonic acid (Alfa Aesar, Sigma Aldrich).

For general laboratory work, materials included 1 in.×3 in., 1.2 mm thick plain pre-cleaned micro slides (VWR International LL), 20 mL borosilicate scintillation vials (Wheaton), Eppendorf Research® plus single channel 10-100 μL micropipettes, and 9" and 5¾" inches disposable lime glass Pasteur pipets (VWR International LL).

Surface Analysis Techniques. The hydrated hydrogel gradually loses its water content by evaporation and is thus only stable in an aqueous environment. Yet water and other chemicals present under physiological conditions may be factors that degrade the chemical modification. Other methods of analysis are required to accommodate for its hydrated nature. Scanning electron microscopy (SEM) and energy-dispersive X-ray spectroscopy (EDS) are two techniques that have been used to assess the presence and composition of surface modifications. SEM/EDS normally function under high vacuum. Degrading the vacuum by allowing for a gaseous environment temporarily accommodates hydrated samples, but is still damaging to the sample. ATR-FTIR and contact angle goniometry are two ambient techniques that are used to assess monomer film quality and stability.

Contact Angle and Wetting. The hydrophobicity and hydrophilicity of the surface assemblies are most easily evaluated by contact angle measurement, which is related to film surface energy. Contact angle is a surface characterization method used to measure the wetting properties of a material. The technique takes into account the liquid-solid interface and the liquid-vapor interface in providing for angle measurements between the material surface and the base of the droplet. A microliter volume droplet of liquid was placed on the surface. Measurements were acquired by calculating the angle between the tangent line at the intersection of the liquid-vapor interface of the droplet profile and the surface. The conventional telescope-goniomtry method was used. For organic surfaces, water is the most commonly used liquid and is used for wetting measurements in this work. Contact angle measurement were taken using an Attension Theta Optical Tensiometer (KSV Instruments) outfitted with a microliter threaded syringe (Hamilton Co.). The Young-Laplace equation was used to calculate the droplet curvature and tangent angle from the digital images.

Infrared Spectroscopy. Infrared (IR) spectroscopy enables the detection of functional groups in a molecule by identifying unique peaks corresponding to the stretching and bending of chemical bonds. This same technique can be applied to SAMs on both optically transparent (transmission mode) and reflective (grazing angle spectral reflectance mode) substrates. IR can evaluate successful monolayer preparation and monitor degradation, as well as determine the degree of ordering in a SAM surface. Antisymmetric and symmetric methylene stretches are diagnostic peaks for alkyl-based monolayers, and appear in the vicinity of 2920 and 2850 $cm^{-1}$ respectively. The wavenumbers for methylene group stretching modes are understood to be diagnostic of whether the chains exist in an all-trans configuration ("ordered" or crystalline state) or in a random configuration ("disordered" and "liquid-like" film). A well-ordered film in this work is defined to be characterized by antisymmetric methylene stretching wavenumber below 2920 $cm^{-1}$ and symmetric methylene stretching wavenumber below 2850 $cm^{-1}$. To assess film quality, ATR-FTIR data were taken using a Nicolet TMiSTM50 FT-IR Spectrometer.

Energy Dispersive X-Ray Spectroscopy. Energy Dispersive X-Ray Spectroscopy (EDS, EDX, or XEDS) is an analytical technique used for chemical characterization or element analysis of a sample. SEM can be coupled with an EDS detector to identify and quantify elements. The principle underlying EDS is the unique atomic structure of each element. A high-energy beam of charged electrons or other particles is used to stimulate the emission of characteristic X-rays from the specimen. Upon inelastic collision, an inner-shell electron transitions to a higher energy orbital, creating a vacancy. In a short period ($10^{-15}$ s), a higher-energy electron transitions to fill this vacancy and emits a characteristic X-ray unique to each element. An X-ray detector acts as a dispersive device that measures the energies of the emitted X-rays, which are then compiled and plotted as a spectrum.

SEM and EDS characterization was performed at the Imaging and Analysis center of the Andlinger Center for Energy and the Environment at Princeton University, using an FEI Quanta 200 FEG Environmental-SEM equipped with an Oxford INCA Synergy 450 EDS system and an Oxford X-Max 80 mm silicon drift detector. The operating conditions were on either low vacuum (0.53 torr) or environmental mode (7-9 torr). The use of environmental mode required the addition of a Gaseous Secondary Electron Detector (GSED) with a bore of 500 μm. A low electron acceleration voltage (5.00 keV) was used on low vacuum to avoid charging of the substrate, but a higher electron acceleration (20.00-30.00 keV) and greater spot size were used to compensate for the added noise from water vapor under ESEM.

Example 1. Synthesis of $TiO_2$/SAMP Bilayer on OPF

A scintillation vial was filled with titanium tetra-iso-propoxide and then solvent (xylene, toluene or hexane). A separate scintillation vial was filled with the phosphonate monomer and solvent. OPF coupons were laid out onto a new, clean glass slide. The edge of the hydrogel was gently dabbed with a KIMWIPE® tissue to remove excess water. The OPF hydrogel was immersed into the solution of titanium tetra-iso-propoxide/solvent and gently swirled to prevent the sample from sticking to the glass walls and to ensure even exposure of the sample surface. The OPF sample was removed and briefly rinsed in iso-propanol and then placed on a pre-heated glass slide atop a hot plate at 35 to 40° C. in order complete cross-linking of the $TiO_2$ adhesion layer. After heating, the $TiO_2$ patterned OPF sample was submerged into the phosphonate monomer solution. The vial containing the system was swirled to prevent sticking, and if needed, tweezers were used to prevent the sample from folding on itself. After the chosen time period had elapsed, the sample was rinsed in iso-propanol and then placed on a pre-heated glass slide atop a hot plate. The surface treated OPF was stored in PBS solution.

Example 2. Deboss-Patterning of OPF

Preparing the materials: OPF was cut into 5 mm×5 mm squares and hydrated with water to form 1 cm×1 cm hydrated OPF squares; this swelling of the OPF is due to the uptake of water. A 20 mL glass vial was used, and glass slides that were used in the debossing process were cut into 1 cm×3.5 cm rectangles; these were rinsed with deionized water and dried under a stream of nitrogen. Shadow masks were prepared by laser-cutting stripes in sheets of KAPTON® polyimide film (DuPont); masks consisting of ablated stripes about 30 μm wide that were separated by unablated KAPTON® stripes 30 μm wide were typically used. KAPTON® masks used ranged from 10 μm to 120 μm, and were preferably 20 μm to 50 μm thick. The weight used for debossing had a flat bottom to ensure even weight distribution, and ranged from none to 500 grams, and was preferably 100-200 grams.

Preparing the solutions to synthesize the cell-adhesive patterns on OPF: A nitrogen atmosphere bag (alternatively a glove box) was set up as a working space to prepare solutions of two reagents in the 20 mL glass vials. A nitrogen atmosphere box or bag was used to maintain low moisture levels in the preparation of the two types solutions described herein; the first solution prepares the precursor of the oxide adhesion layer, and the second solution is of the phosphonic acid that yields the cell-adhesive surface. The titanium(IV) tetra-iso-propoxide solution was prepared from 30 μL of titanium(IV) tetra-iso-propoxide (CAS: 546-88-9) that was added to 5 mL of a hydrophobic solvent such as anhydrous toluene (CAS: 108-88-3). When zirconium (IV) tetra-iso-propoxide was used instead of the titanium analog, 1 mg of zirconium (IV) tetra-iso-propoxide (CAS: 14717-56-7) was added to 5 mL of anhydrous toluene. In a separate vial, 1 mg of 1,12-dodecanediphosphonic acid (CAS: 7450-59-1) was added to 5 mL of anhydrous toluene. These solutions were capped tightly and used in the patterning steps.

Debossing the OPF to prepare cell-adhesive patterns on its surface: A piece of hydrated OPF was dried on filter paper. A small drop of water was placed on a glass slide of dimensions given above, and the OPF coupon was placed on the drop of water to hold it to the glass slide. Any excess water was blotted from the OPF surface using a piece of filter paper. The laser-ablated KAPTON® shadow mask was placed onto the OPF such that the striped area was directly in contact with the OPF surface. The OPF-mask composite was heated to 30° C. on a temperature controlled hot plate, and the mask was depressed into the OPF (debossing) using a 200-gram weight; heating with the mask in place was continued for 15 s. Any excess water was blotted off the surface of the OPF-mask ensemble; the ensemble was then placed into the vial of either the titanium or zirconium precursor solution described above. The ensemble was left immersed for 30 s.

The ensemble was then removed from this solution, rinsed 3 times with toluene and then was heated to 30° C. for 30 s; this creates a layer of cross-linked oxide that is patterned on the OPF surface as only the regions of the OPF that are not covered by the KAPTON® shadow mask (the ablated stripes) are exposed to the solution of the titanium or zirconium alkoxide. The ensemble was removed from heat and allowed to cool for 15 s before being immersed in the phosphonic acid solution described above, which yields the cell adhesive stripes on the oxide covered areas of the OPF surface. The ensemble remained in this solution for several hours, and was then rinsed successively with toluene, iso-propanol and water. The KAPTON® mask and glass slide were separated mechanically from the OPF surface if they had not already detached during the rinsing process. The piece of now-patterned OPF was heated on a temperature-controlled hot plate at 30° C. for 30 s. Freshly prepared patterned OPF samples were stored either in water or PBS.

Cleaning reusable materials: The shadow masks were cleaned by sonicating in a dilute solution of potassium hydroxide for 15 seconds. The shadow masks were then sonicated three more times in water for 5 min each before they were air dried.

Example 3. In Vitro Cell-Based Devices

The cornea consists in part of confluent, closely packed layers of corneal epithelial cells at the external surface of the eye (called "anterior" with regard to the eye body). Therefore, the first type of device consists of human corneal epithelial cells that are attached to and spread on our patterned hydrogel according to our published procedures. These cells are commercially available (from ScienCell, catalog no. 6520, for example). The second type of device is prepared first using corneal keratocytes (corneal fibroblasts, also commercially available from ScienCell, catalog no. 6510) that are attached to and spread on our patterned hydrogel according to our published procedures. These cells, once at confluence, assemble a collagen-rich ECM such as we have observed using NIH 3T3 fibroblasts. This ECM then serves as a substrate on which corneal epithelial cells are plated, and to which they attach and spread. This second type of device, therefore, serves as a model for the interface between corneal epithelial cells and the corneal stroma.

Figure 2:
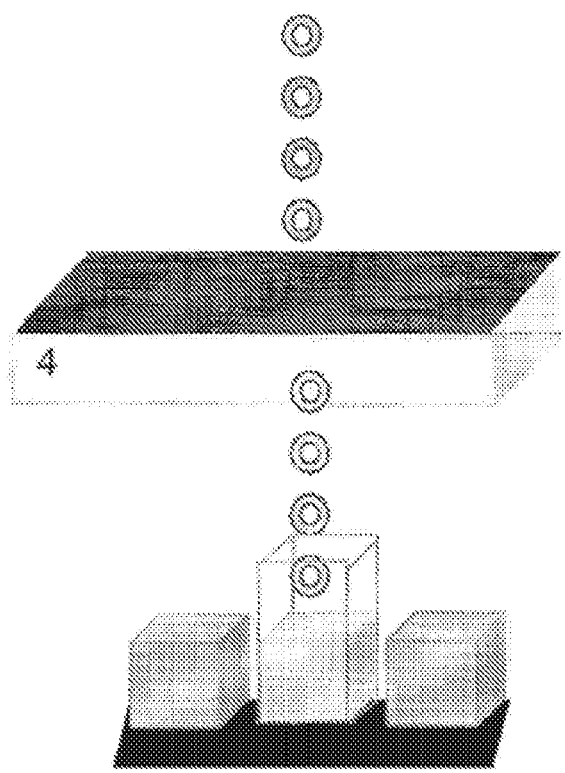
FIG. 2 shows a schematic diagram where a confluent layer of corneal epithelial cells is formed on the surface of the patterned hydrogel (4) in alignment with the chemical pattern. The test material (potential irritant) is then dropped onto the cell surface, and material is collected following diffusion through the cell layer and hydrogel layer in a cuvette that is inserted in an IR spectrometer (gray boxes on a black support).
Figure 3:
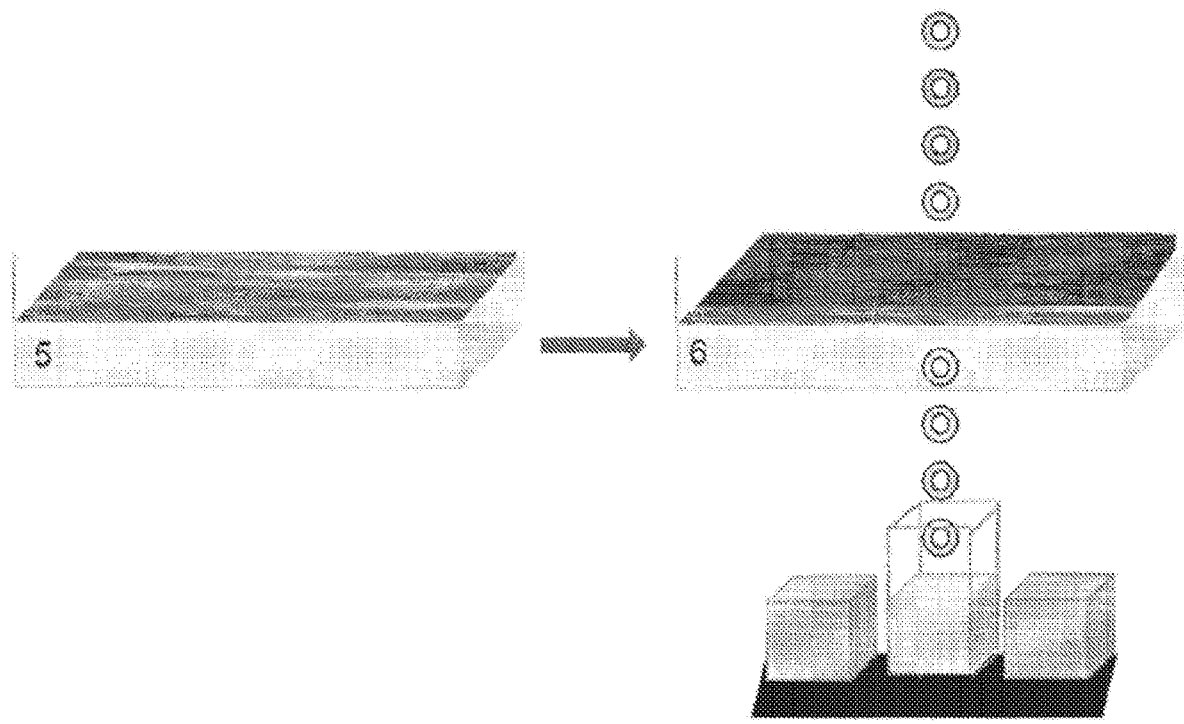
FIG. 3 shows a schematic diagram where collagen-rich extracellular matrix (ECM, 5) is cell-assembled using human corneal keratocytes. A confluent layer of human corneal epithelial cells is formed on the surface of the patterned ECM (6). The test material (potential irritant) is then dropped on the cell surface, and material is collected following diffusion through the cell layers and the hydrogel in a cuvette that is inserted in an IR spectrometer (gray boxes on a black support).
Figure 4:
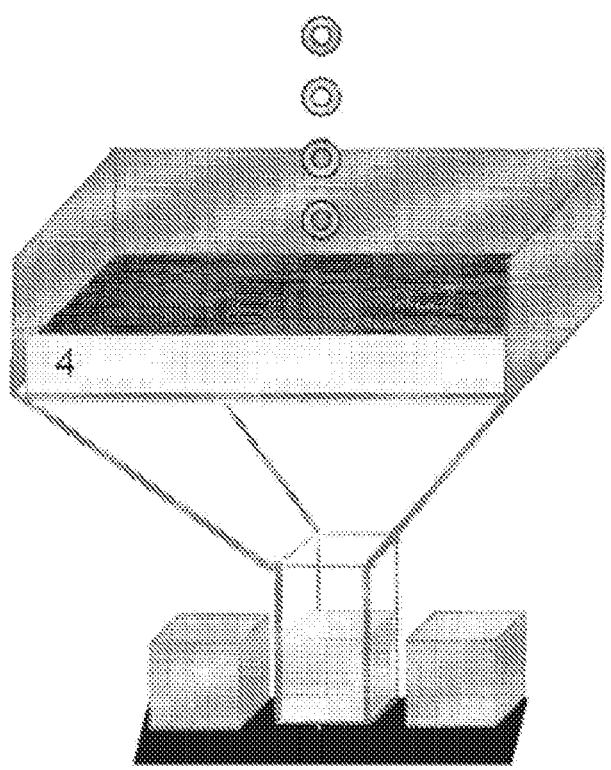
FIG. 4 shows a schematic diagram where the hydrogel layer is supported by a web (lower bar); the hydrogel-web ensemble fits tightly into a glass apparatus. The hydrogel is immersed in a medium that supports cell viability, and the entire container (shown in cross-section) terminates in the IR cuvette. Material diffuses through the cell/hydrogel/support web ensemble, and is analyzed by IR.

These two types of cell-based devices are prepared to test the diffusion of potential irritants through a cornea analog, and also to visualize any cell damage that results from contact of cell layers with these irritants. Both devices involve confluent layers of cells that are prepared on a patterned, water-saturated hydrogel; both are equipped with an infrared spectrometer detector. Effluent resulting from diffusion of the potential irritant through the cell(s) layer(s) is collected in a standard IR sampling cell that collects the through-diffused materials. A known concentration of a potential irritant dissolved in water has its IR spectrum measured quantitatively, which serves as a benchmark. By following the time course of infrared signal intensity change, the kinetics of irritant diffusion/penetration through the cell(s) layers(s) are measured spectroscopically. Cartoons for these cell-based devices are shown in FIGS. 2, 3 and 4. Thus, FIG. 2 shows a schematic diagram where a confluent layer of corneal epithelial cells is formed on the surface of the patterned hydrogel (4) in alignment with the chemical pattern. The test material (potential irritant) is then dropped onto the cell surface, and material is collected following diffusion through the cell layer and hydrogel layer in a cuvette that is inserted in an IR spectrometer (gray boxes on a black support). Any damage to the cell(s) layer(s) is probed through microscopic examination.

FIG. 3 shows a schematic diagram where collagen-rich extracellular matrix (ECM, 5) is cell-assembled using corneal keratocytes. A confluent layer of corneal epithelial cells is formed on the surface of the patterned ECM (6). The test material (potential irritant) is then dropped on the cell surface, and material is collected following diffusion through the cell layers and the hydrogel in a cuvette that is inserted in an IR spectrometer (gray boxes on a black support).

The hydrogel is immersed in media to maintain cell viability, and the irritant material is tested by diffusion through the hydrogel. The hydrogel is supported by a web, and the entire "aqueous" system is in a holder that terminates in the cuvette, FIG. 4. FIG. 4 shows a schematic diagram where the hydrogel layer is supported by a web (lower bar); the hydrogel-web ensemble fits tightly into a glass apparatus. The hydrogel is immersed in a medium that supports cell viability, and the entire container (shown in cross-section) terminates in the IR cuvette. Material diffuses through the cell/hydrogel/support web ensemble, and is analyzed by IR.

Cell-Based Device 1.

Device 1 comprises: a confluent layer of epithelial cells supported on a chemically patterned, water-saturated hydrogel, where the cells are aligned with the chemical pattern; and a detector responsive to the composition or compound being tested, the IR detector being placed below the supporting hydrogel.

Cell-Based Device 2.

Device 2 comprises: a confluent layer of epithelial cells, aligned on the surface of a collagen-rich extracellular matrix (ECM) assembled by corneal keratocytes supported on a chemically patterned, water-saturated hydrogel, where both the ECM and confluent layer of epithelial cells are aligned with the chemical pattern; and a detector responsive to the composition or compound being tested, the IR detector being placed below the supporting hydrogel.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the present claims. All publications cited herein are incorporated by reference in their entirety for all purposes.

What is claimed is:

1. A cell-based device for in vitro testing of compositions or compounds for irritation potential, said device comprising:
   a) a receptacle for receiving a fluid containing a test material;
   b) a confluent layer of epithelial cells supported on a chemically patterned, water-saturated hydrogel, wherein said cells are aligned with the chemical pattern and the hydrogel is configured to receive the fluid containing the test material from the receptacle; and
   c) a collector configured to receive effluent fluid from the hydrogel.

2. The device of claim 1, further comprising a detector responsive to the composition or compound being tested.

3. The device of claim 1, further comprising a collagen-rich extracellular matrix (ECM) assembled by corneal keratocytes supported on said chemically patterned hydrogel, upon which ECM said aligned confluent layer of epithelial cells is formed.

4. The device of claim 1, wherein said hydrogel comprises a biocompatible cross-linked hydrophilic polymer hydrogel.

5. The device of claim 4, wherein said biocompatible hydrophilic polymer is a cross-linkable polymer selected from the group consisting of polyethylene glycol, polyacrylate, polyacrylamide, polyvinyl alcohol, polysaccharides, alginates, hyaluronic acids, guar gum, xanthan gum, carrageenan, methyl cellulose, carboxymethyl cellulose, ethyl methyl cellulose, hydroxypropyl cellulose, and hypromellose.

6. The device of claim 5, wherein said biocompatible cross-linkable polymer is cross-linked with a dicarboxylic acid or a dicarboxylic acid derivative.

7. The device of claim 1, wherein said chemical pattern covers at least part of the hydrogel surface, and comprises an inorganic oxide adhesion layer bonded to the surface of an at least partially hydrated, biocompatible, cross-linked hydrophilic polymer hydrogel, wherein said inorganic oxide is selected from the group consisting of the oxides of Ti, Zr, Al, Mg, Si, Zn, Mo, Nb, Ta, Sn, W, and V.

8. The device of claim 7, wherein said inorganic oxide is selected from the group consisting of the oxides of Al, Ti, Zr, Si, Mg and Zn.

9. The device of claim 7, wherein said chemical pattern comprises continuous parallel stripes spanning at least part of the hydrogel surface.

10. The device of claim 7, wherein said chemical pattern further comprises a self-assembled monolayer of phosphonates (SAMP).

11. The device of claim 10, wherein said SAMP is selected from the group consisting of $C_3$-$C_{30}$ $\alpha$, $\omega$-diphosphonates.

12. The device of claim 1, wherein said epithelial cells are corneal epithelial cells.

13. The device of claim 12, wherein said corneal epithelial cells are human corneal epithelial cells.

14. The device of claim 2, wherein said detector is an infrared (IR) detector.

15. A cell-based method for in vitro testing compositions or compounds for irritation potential, comprising the steps of:
  1) providing a source of test material comprising a composition or compound of interest;
  2) providing a confluent layer of corneal epithelial cells supported on a chemically patterned, water-saturated hydrogel, wherein said cells are aligned with the chemical pattern;
  3) adding said composition or compound to said aligned confluent corneal epithelial cell layer;
  4) collecting an effluent fluid in a collector;
  5) monitoring diffusion of said composition or compound through said corneal epithelial cell layer using a detector responsive to the composition or compound; and
  6) assessing damage to the corneal epithelial cells visually or microscopically.

16. The method of claim 15, further comprising a collagen-rich extracellular matrix (ECM) assembled by corneal keratocytes supported on said chemically patterned hydrogel, upon which ECM said aligned confluent layer of corneal epithelial cells is formed.

17. The method of claim 15, wherein said corneal epithelial cells are human corneal epithelial cells.

18. The method of claim 15, wherein said monitoring comprises infrared (IR) detection.

19. The method of claim 15, wherein the chemical pattern comprises an inorganic oxide adhesion layer bonded to the surface said hydrogel, wherein said pattern comprises continuous parallel stripes spanning at least part of the hydrogel surface, and wherein said inorganic oxide is selected from the group consisting of the oxides of Al, Ti, Zr, Si, Mg and Zn.

20. The method of claim 19, wherein said chemical pattern further comprises a self-assembled monolayer of phosphonates (SAMP) selected from the group consisting of $C_3$-$C_{30}$ $\alpha$, $\omega$-diphosphonates.

* * * * *